US012606989B2

(12) United States Patent
Nakajima et al.

(10) Patent No.: US 12,606,989 B2
(45) Date of Patent: Apr. 21, 2026

(54) HYDRAULIC CONTROL SYSTEM IN WORKING MACHINE

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

(*) Notice: Subject to any disclaimer, the term of this patent is extended or adjusted under 35 U.S.C. 154(b) by 0 days.

(21) Appl. No.: 19/051,641

(22) Filed: Feb. 12, 2025

(65) Prior Publication Data

US 2025/0257551 A1 Aug. 14, 2025

(51) Int. Cl.

| | |
|---|---|
| ***E02F 9/22*** | (2006.01) |
| ***F15B 11/16*** | (2006.01) |
| ***F15B 11/17*** | (2006.01) |

(52) U.S. Cl.

CPC .......... *E02F 9/2242* (2013.01); *E02F 9/2228* (2013.01); *E02F 9/2292* (2013.01); *E02F 9/2296* (2013.01); *F15B 11/165* (2013.01); *F15B 11/17* (2013.01); *F15B 2211/253* (2013.01); *F15B 2211/265* (2013.01); *F15B 2211/2654* (2013.01); *F15B 2211/2656* (2013.01); *F15B 2211/41509* (2013.01); *F15B 2211/455* (2013.01)

(58) Field of Classification Search

CPC .................... F15B 11/165; F15B 11/17; F15B 2211/41509; E02F 9/2225; E02F 9/2228; E02F 9/2239; E02F 9/2242

See application file for complete search history.

(56) References Cited

U.S. PATENT DOCUMENTS

| | | | | |
|---|---|---|---|---|
| 5,829,252 | A * | 11/1998 | Hirata | E02F 9/2242 60/429 |
| 9,790,665 | B2 * | 10/2017 | Tajima | E02F 9/2285 |
| 10,309,079 | B2 * | 6/2019 | Moriki | E02F 9/2282 |
| 10,330,128 | B2 * | 6/2019 | Moriki | E02F 3/32 |
| 11,566,640 | B2 * | 1/2023 | Nakajima | F15B 11/024 |

(Continued)

FOREIGN PATENT DOCUMENTS

| | | | |
|---|---|---|---|
| JP | 0823768 | B2 | 3/1996 |
| JP | 2007100779 | A | 4/2007 |

*Primary Examiner* — Michael Leslie

(57) ABSTRACT

Problem: In a case where the hydraulic actuator A supplied with hydraulic oil only from the first hydraulic pump and the hydraulic actuator B supplied with hydraulic oil from the first and second hydraulic pumps are operated simultaneously, even if the required flow rate for the first hydraulic pump of the hydraulic actuators A and B exceeds the first hydraulic pump maximum discharge flow rate, the hydraulic actuators A and B can be driven at the operation speed corresponding to the operation amount of the operation means.

Solution: A target flow rate correction means is provided for setting the bucket cylinder required flow rate as a target flow rate from the hydraulic pump to the bucket cylinder, a flow rate obtained by subtracting the bucket cylinder required flow rate from the pump maximum discharge flow rate as a target flow rate from the hydraulic pump to the boom cylinder, and setting a flow rate obtained by subtracting the target flow rate from the hydraulic pump to the boom cylinder from the bucket cylinder total required flow rate as a target flow rate from the hydraulic pump to the boom cylinder.

4 Claims, 5 Drawing Sheets

(56) References Cited

U.S. PATENT DOCUMENTS

| | | | | |
|---|---|---|---|---|
| 11,629,479 | B2 * | 4/2023 | Nakajima | E02F 9/2285 60/468 |
| 11,692,332 | B2 * | 7/2023 | Nakajima | F15B 11/165 60/421 |
| 12,018,459 | B2 * | 6/2024 | Nakajima | F15B 21/087 |
| 12,180,682 | B2 * | 12/2024 | Nakajima | E02F 9/2296 |
| 12,345,019 | B2 * | 7/2025 | Nakajima | F15B 13/0401 |
| 12,366,054 | B2 * | 7/2025 | Nakajima | E02F 9/2292 |
| 12,410,588 | B2 * | 9/2025 | Nakajima | E02F 9/2004 |

* cited by examiner

HYDRAULIC CONTROL SYSTEM IN WORKING MACHINE

CROSS-REFERENCE TO RELATED APPLICATION

This application claims priority under 35 USC § 119 and the Paris Convention to Japanese Patent Application 2024-019539 filed on Feb. 13, 2024.

TECHNICAL FIELD

The present invention relates to the technical field of a hydraulic control system in a working machine such as a hydraulic excavator.

BACKGROUND OF THE INVENTION

In general, a hydraulic system provided in a working machine such as a hydraulic excavator, includes a first hydraulic pump, a second hydraulic pump, and a plurality of hydraulic actuators using these first and second hydraulic pumps as hydraulic supply sources, and in the plurality of hydraulic actuators, there are a hydraulic actuator A which uses either one of the hydraulic pumps of the first and second hydraulic pumps as a hydraulic supply source, and a hydraulic actuator B using the first and second hydraulic pumps as a hydraulic supply source. In such a hydraulic system, hydraulic oil from both the first and second hydraulic pumps is merged and supplied to the hydraulic actuator B, but in this case, the hydraulic interference caused by the merging may lead to a decrease in efficiency and a deterioration in operability. Therefore, in the case where the hydraulic actuator B is supplied with the hydraulic oil, the oil pressure is supplied only from the first and second hydraulic pumps at first, and the oil pressure is supplied from the other hydraulic pump in accordance with an increase in the operation amount.

With this configuration, even if the hydraulic actuator B uses both the first and second hydraulic pumps as hydraulic pressure supply sources, the hydraulic oil is supplied only from one hydraulic pump when the operation amount of the operation tool is not large, so that the merging frequency of the hydraulic oil from the two hydraulic pumps can be reduced, and the reduction in efficiency and the deterioration in operability caused by the merging can be reduced.

When the hydraulic actuator A and the hydraulic actuator B are simultaneously operated (composite operation), the total flow rate of the hydraulic actuator A required flow rate depending on the operation amount of the operation tool for the hydraulic actuator A and the hydraulic actuator B required flow rate depending on the operation amount of the operation tool for the hydraulic actuator B may exceed the maximum discharge flow rate of the first hydraulic pump for the hydraulic pump (hereinafter referred to as the first hydraulic pump) serving as the hydraulic supply source of the hydraulic actuator A. In this case, the flow rate of the required flow rate cannot be supplied from the first hydraulic pump to the hydraulic actuator A or the hydraulic actuator B or both the hydraulic actuators A and B.

Therefore, when the total flow rate of the hydraulic actuator A required flow rate and the hydraulic actuator B required flow rate with respect to the first hydraulic pump exceeds the maximum discharge flow rate of the first hydraulic pump, there is a known technique that prioritizes the supply of hydraulic oil to the hydraulic actuator A using only the first hydraulic pump as a hydraulic oil supply source (see, for example, Patent Document 1). In this case, when the total flow rate of the hydraulic actuator A required flow rate and the hydraulic actuator B required flow rate for the first hydraulic pump is larger than the maximum discharge amount of the first hydraulic pump, an opening degree of the control valve (merging control valve) for controlling the supply flow rate from the first hydraulic pump to the hydraulic actuator B is controlled so that a flow rate obtained by subtracting the required flow rate of the hydraulic actuator A from the maximum discharge flow rate of the first hydraulic pump can pass. That is, while the flow rate corresponding to the operation amount is supplied to the hydraulic actuator A, only the remaining flow rate of the hydraulic actuator B is reduced from the maximum discharge flow rate of the first hydraulic pump to the hydraulic actuator A.

On the other hand, as a technique for improving operability at the time of composite operation, conventionally, a technique is also known in which the order of hydraulic oil supply from the first and second hydraulic pumps (front pump and rear pump) to each hydraulic actuator is prioritized in accordance with the combination of hydraulic actuators operated at the same time, and the hydraulic oil supply timing and the hydraulic oil supply amount are controlled separately (see, for example, Patent Document 2).

PRIOR ART LITERATURE

Patent Document

Patent Document 1: JP 2007-100779 A.
Patent Document 2: JPH 8-23768 A

SUMMARY OF THE INVENTION

The Problem to be Solved

However, as described above, in the above mentioned patent document 1, when the total flow rate of the hydraulic actuator A required flow rate and the hydraulic actuator B required flow rate for the first hydraulic pump is larger than the maximum discharge amount of the first hydraulic pump, the flow rate corresponding to an operation of an operation tool is supplied to the hydraulic actuator A, and the remaining flow rate is supplied to the hydraulic actuator B. For this reason, the hydraulic actuator A can be operated at a speed corresponding to an operation amount of the operation tool, but the operation speed of the hydraulic actuator B is lower than the operation speed required by the operation amount of the operation tool, and the degree of reduction thereof depends on the flow rate supplied to the hydraulic actuator A.

On the other hand, in the above mentioned patent document 2, it is structured that the hydraulic oil is supplied from the first and second hydraulic pumps to any one of the hydraulic actuators operated simultaneously at the time of the composite operation, and the bucket cylinder to which the hydraulic oil is supplied only from the first hydraulic pump at the time of the single operation is supplied with the hydraulic oil from the second hydraulic pump or from both the first and second hydraulic pumps at the time of the composite operation. That is, in the patent document 2, the first and second hydraulic pumps are frequently combined with each other, and therefore, there is a problem that the circuit becomes complicated because the possibility of lowering the efficiency and the operability from the merging of the first and second hydraulic pumps is increased, and the circuit for supplying the oil mixture to the hydraulic actuator which is not a large flow actuator is required, which is a problem to be solved by the present invention.

The Means to Solve the Problem

The present invention is proposed in view of the above-mentioned practical situations, and its purpose is to solve this problem. The invention of claim 1 is a hydraulic control system in a working machine, comprising:

- a first hydraulic pump, a second hydraulic pump, a plurality of hydraulic actuators for driving at least one of the hydraulic pumps as a hydraulic pressure supply source, each hydraulic actuator operation means operated to drive each hydraulic actuator, a control valve for controlling a flow rate of hydraulic oil supplied from each hydraulic pump to each hydraulic actuator, and a control device for controlling the control valve to obtain a target flow rate from each hydraulic pump to each hydraulic actuator based on an operation of the hydraulic actuator operation means, and to supply the target flow rate to each hydraulic actuator,
- the hydraulic actuator includes a hydraulic actuator A to which the hydraulic oil is supplied only from a first hydraulic pump of the first and second hydraulic pumps, and a hydraulic actuator B to which the hydraulic oil is supplied from both the first and second hydraulic pumps when a maximum flow rate is supplied, and the hydraulic actuator B is set to be supplied with the hydraulic oil from the first hydraulic pump first when the hydraulic actuator B operation means is operated, and to be supplied with the hydraulic oil from the second hydraulic pump in addition to the first hydraulic pump according to an increase in an operation amount,
- wherein the control device includes a target flow rate adjustment means which, when the hydraulic actuator A operation means and the hydraulic actuator B operation means are simultaneously operated:
  - determines an actuator A first required flow rate that the hydraulic actuator A requires from the first hydraulic pump in accordance with an operation amount of the hydraulic actuator A operation means, actuator B first and second required flow rates that the hydraulic actuator B requires from the first and second hydraulic pumps respectively in accordance with an operation amount of the hydraulic actuator B operation means, total first and second required flow rates that are the sum of required flow rates that the hydraulic actuators including the hydraulic actuator A and the hydraulic actuator B being simultaneously operating respectively require from the first and second hydraulic pumps as a hydraulic supply source, and an actuator B total required flow rate that is the sum of the actuator B first required flow rate and the actuator B second required flow rate, and
  - sets the actuator A first required flow rate as a target flow rate from the first hydraulic pump to the hydraulic actuator A, a flow rate obtained by subtracting the actuator A first required flow rate from a first hydraulic pump maximum discharge flow rate as a target flow rate from the first hydraulic pump to the hydraulic actuator B, and a flow rate obtained by subtracting the target flow rate from the first hydraulic pump to the hydraulic actuator B from the actuator B total required flow rate as a target flow rate from the second hydraulic pump to the hydraulic actuator B.

For the invention of claim 2, in the hydraulic control system in the working machine of claim 1, when the flow rate obtained by subtracting the actuator A first required flow rate from the first hydraulic pump maximum discharge flow rate is equal to or less than an actuator B first minimum flow rate set in advance as a minimum supply flow rate from the first hydraulic pump to the hydraulic actuator B, an target flow rate adjustment means performs first correction and control of target flow rate to correct and set the flow rate obtained by subtracting the actuator B first minimum flow rate from the first hydraulic pump maximum discharge flow rate as the target flow rate from the first hydraulic pump to the hydraulic actuator A, correct and set the first minimum flow rate of the actuator B as the target flow rate from the first hydraulic pump to the hydraulic actuator B, and correct and set a flow rate obtained by subtracting the actuator B first minimum flow rate from the actuator B total required flow rate as the target flow rate from the second hydraulic pump to the hydraulic actuator B.

For the invention of claim 3, in the hydraulic control system in a work machine in claim 1, when the target flow rate from the second hydraulic pump to the hydraulic actuator B set in claim 1 is equal to or greater than an actuator B second maximum flow rate set in advance as a maximum supply flow rate from the second hydraulic pump to the hydraulic actuator B, the target flow rate adjustment means performs second correction and control of target flow rate to correct and set the actuator B second maximum flow rate as the target flow rate from the second hydraulic pump to the hydraulic actuator B.

The invention of claim 4 is a hydraulic control system in a work machine, wherein in claim 2, when the target flow rate from the second hydraulic pump to the hydraulic actuator B set in claim 2 is equal to or greater than an actuator B second maximum flow rate that is set in advance as a maximum supply flow rate from the second hydraulic pump to the hydraulic actuator B, the target flow adjustment means performs second correction control of the target flow rate to correct and set the actuator B second maximum flow rate as the target flow rate from the second hydraulic pump to the hydraulic actuator B.

Effects of the Invention

According to the invention of claim 1, both the hydraulic actuator A and the hydraulic actuator B can be driven at an operation speed corresponding to the operation amount of the operation means, thereby contributing to the improvement of operability and improvement in the working efficiency, and avoiding an increase in the frequency of merging and a complication of the circuit.

According to the invention of claim 2, even if the required flow rate required by the hydraulic actuator A is large, the minimum flow rate at which the hydraulic oil is supplied from the first hydraulic pump to the hydraulic actuator B can be ensured, and the complication of control can be avoided.

According to the invention of claims 3 and 4, even when the operation means for the hydraulic pump A and the hydraulic actuator B operate and at the same time, the second hydraulic pump is operated by the operation means for other hydraulic actuators as the hydraulic supply source, it is ensured to supply the hydraulic oil to the other hydraulic actuators.

DETAILED DESCRIPTION OF PREFERRED EMBODIMENTS

Hereinafter, embodiments of the present invention will be described with reference to the drawings.

Figure 1:
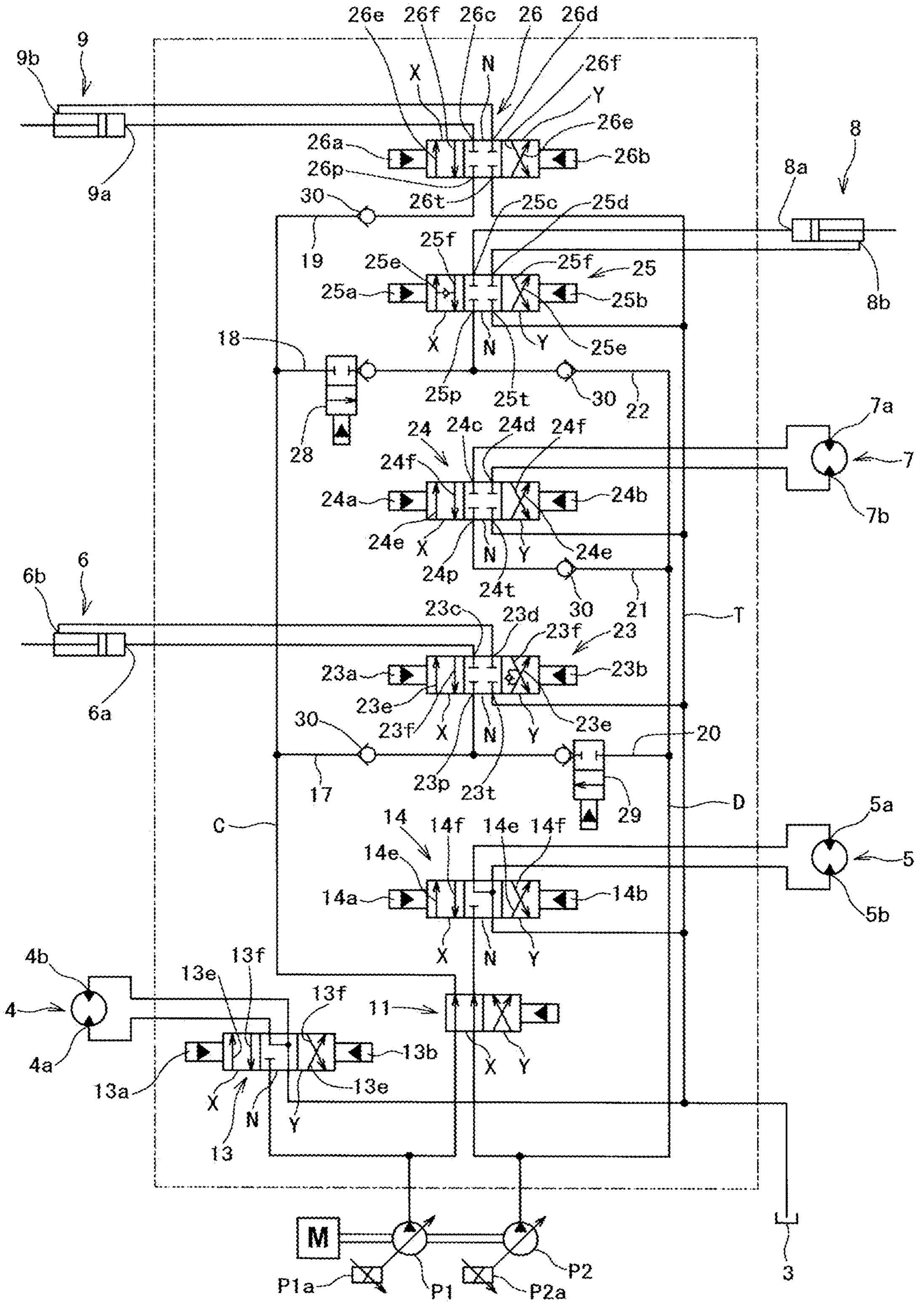
FIG. 1 is a hydraulic circuit diagram of a hydraulic excavator.

FIG. 1 is a hydraulic circuit diagram showing a hydraulic control system of the hydraulic excavator 1 according to the present invention. In FIG. 1, P1 and P2 are variable capacity hydraulic pumps driven by the prime mover M; P1*a* and P2*a* are variable capacity means for varying capacities of the hydraulic pumps P1 and P2; 3 is an oil tank; 4 is a left running motor; 5 is a right running motor; 6 is a boom cylinder; 7 is a rotary motor; 8 is a stick cylinder; and 9 is a bucket cylinder. The left running motor 4, the right running motor 5, the boom cylinder 6, the rotary motor 7, the stick cylinder 8, and the bucket cylinder 9 are hydraulic actuators using the hydraulic pumps P1 and P2 as hydraulic supply sources, and among these hydraulic actuators, the rotary motor 7 and the bucket cylinder 9 use one hydraulic pumps of the hydraulic pumps P1 and P2 as an hydraulic supply source, and the boom cylinder 6 and the stick cylinder 8 are hydraulic actuators using both the hydraulic pumps P1 and P2 as the hydraulic supply source. In the present embodiment, the left running motor 4 and the right running motor 5 do not correspond to the hydraulic actuators of the present invention.

Figure 2:
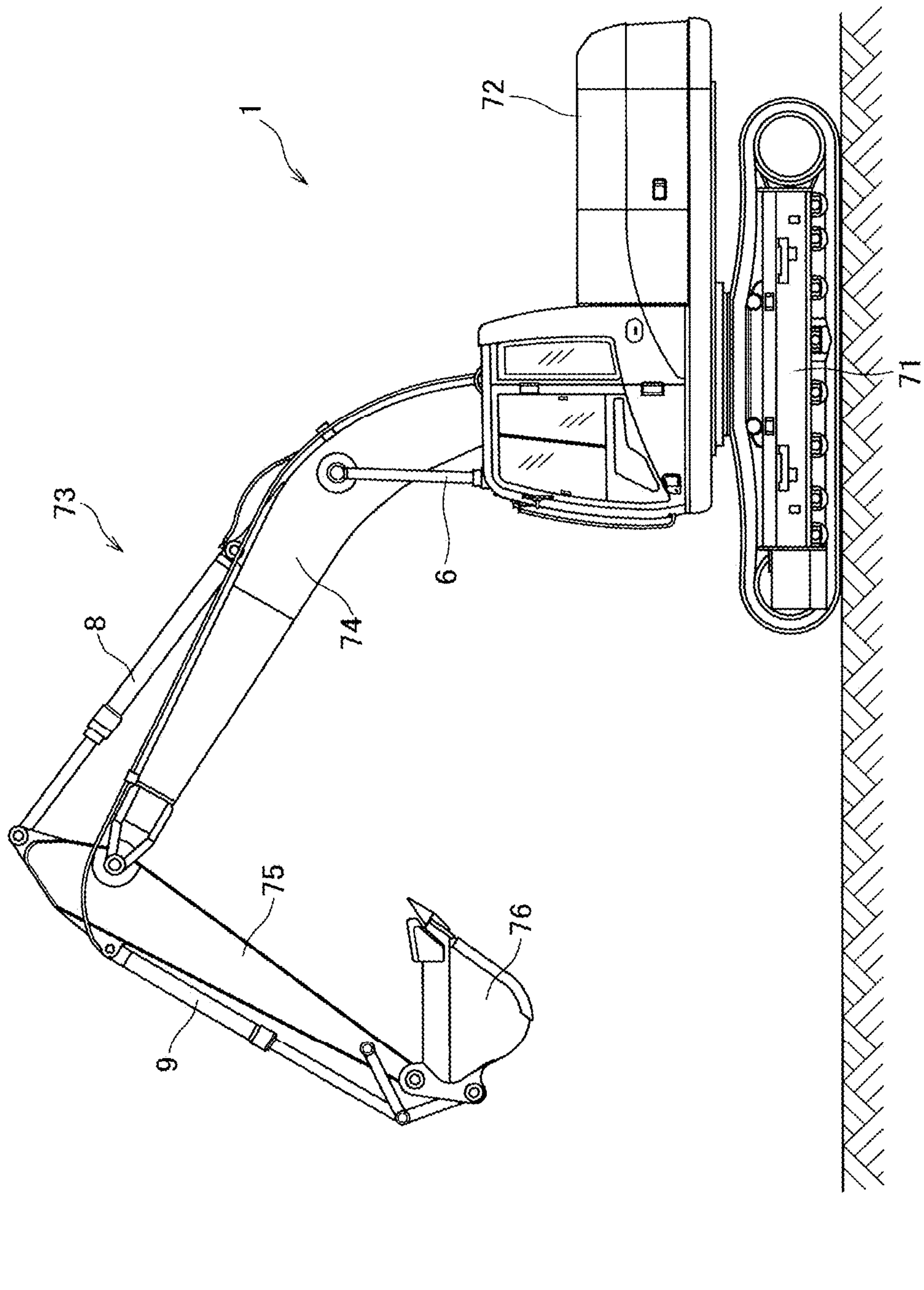
FIG. 2 is a side view of a hydraulic excavator.

The hydraulic excavator 1 is an example of the work machine of the present invention, and as illustrated in FIG. 2, is configured to include a lower running body 71 including a left and right running body driven by the left and right running motors 4 and 5, an upper rotary body 72 freely rotatably supported by the lower running body 71 and rotatably driven by the rotary motor 7, and a front working machine 73 mounted on the upper rotary body 72, wherein the front working machine 73 is configured to include a boom 74 being supported on the upper rotary body 72 in a manner of freely vertically movable and driven by the boom cylinder 6, a stick 75 freely rotaryably pivoted at a tip portion of the boom 74 and driven by the stick cylinder 8, and a bucket 76 mounted on the tip portion of the stick 75 and driven by the bucket cylinder 9.

The hydraulic pump P1 is connected to a pump line C via a running straight valve 11 at a first position X, which will be described later, and is also connected to a left running directional switching valve 13. On the other hand, the hydraulic pump P2 is connected to a pump line D and is connected to a right running directional switching valve 14 via the running straight valve 11 at the first position X.

The running straight valve 11 is a two-position switching valve that switches between the first position X and a second position Y based on a control signal output from the controller 10 described later. In a state where the running straight valve 11 is located at the first position X, the discharge oil of the hydraulic pump P1 is supplied to the pump line C and the left running directional switching valve 13, and the discharge oil of the hydraulic pump P2 is supplied to the pump line D and the right running directional switching valve 14; and in a state where the running straight valve 11 is located at the second position Y, the discharge oil of the hydraulic pump P1 is supplied to both the left and right running directional switching valves 13 and 14, and the discharge oil of the hydraulic pump P2 is supplied to both the pump lines C and D. Then, the controller 10 controls the running straight valve 11 to be positioned at the first position X when only the left and right running operation tool (not shown) is operated or when only other hydraulic actuator operation tools (not shown operation tools for boom, rotary, stick, and bucket operation tools) other than the running operation tool are operated. On the other hand, when both left and right running operation tool is operated to run straight and the other hydraulic actuator operation tools are simultaneously operated, a control signal is output to switch the running straight valve 11 to the second position Y. Thus, when only the left and right running operation tool is operated, the discharge oil of the hydraulic pumps P1 and P2 is supplied to the left and right running motors 4 and 5 via the left and right running directional switching valves 13 and 14, respectively, by the running straight valve 11 positioned at the first position X, so that the supply flow rate to both the running motors 4 and 5 can be made equal, while the discharge flow rate of the hydraulic pump P1 can be distributed only to the left and right running motors 4 and 5 and the supply flow rate to both the running motors 4 and 5 can be made equal, and the discharge flow rate of the hydraulic pump P2 can be supplied to other hydraulic actuators. Note that, in the following description, the running straight valve 11 is located at the first position X; that is, the discharge oil of the hydraulic pump P1 is supplied to the pump line C and the left running directional switching valve 13, and the discharge oil of the hydraulic pump P2 is supplied to the pump line D and the right running directional switching valve 14.

The left and right running directional switching valves 13 and 14 are closed-center spool valves for performing the supply/discharge flow rate control for the left and right running motors 4 and 5 and for switching the supply/discharge direction, and includes a forward and backward pilot ports 13*a*, 13*b*, 14*a*, 14*b* connected to a left running forward electromagnetic proportional valve, a left running backward electromagnetic proportional valve, a right running forward electromagnetic proportional valve, and a right running backward electromagnetic proportional valve (not shown) for outputting pilot pressure based on a control signal output from the controller 10. Then, the left and right running directional switching valves 13 and 14 are configured to be positioned at a neutral position N in which the supply and discharge control is not performed for the left and right running motors 4 and 5 in a state in which the pilot pressure is not input to the forward and backward pilot ports 13*a*, 13*b*, 14*a* and 14*b*, but the forward operation position X is switched to by inputting the pilot pressure input to the forward pilot ports 13*a* and 14*a*, then supply valve passages 13*e* and 14*e* for supplying the discharge oil from the hydraulic pumps P1 and P2 to forward ports 4*a* and 5*a* of the left running motor 4 and the right running motor 5 are opened, and discharge valve passages 13*f* and 14*f* for flowing the discharge oil from the backward ports 4*b* and 5*b* to the oil tank 3 are opened; and the backward operation position Y is switched to by inputting the pilot pressure to the backward pilot ports 13*b* and 14*b*, then the supply valve passages 13*e* and 14*e* for supplying the discharge oil of the hydraulic pumps P1 and P2 to the backward ports 4*b* and 5*b* of the left and right running motors 4 and 5 are opened, and the discharge valve passages 13*f* and 14*f* for supplying the discharge oil from the forward ports 4*a* and 5*a* to the oil tank 3 are opened.

Then, the supply flow rate and the discharge flow rate to the left running motor 4 and the right running motor 5 when the left running motor 4 and the right running motor 5 are positioned in the forward operation position or the backward operation position, are controlled by the opening areas of the supply valve passages 13*e*, 14*e* and the discharge valve passages 13*f*, 14*f*, and the opening areas are controlled to increase or decrease in accordance with the spool movement position accompanying the increase or decrease of the pilot pressure output from the running electromagnetic proportional valve (the left-running forward electromagnetic proportional valve, the left-running backward electromagnetic proportional valve, the right-running forward electromagnetic proportional valve, the right-running forward electromagnetic proportional valve, the right-running backward electromagnetic proportional valve) to the forward or backward pilot ports 13*a*, 13*b*, 14*a*, 14*b*. Then, when the left and right running operation tool is operated, the controller 10 controls the running electromagnetic proportional valve so as to output pilot pressure that increases or decreases in accordance with the operation amount of the running operation tool, whereby the left and right running motors 4 and 5 can be driven at a speed corresponding to the operation amount of the running operation tool.

On the other hand, from the pump line C connected to the hydraulic pump P1, a boom main-side supply oil passage 17, a stick sub-side supply oil passage 18, and a bucket supply oil passage 19 are branched and formed a state of being parallel with each other, and from the pump line D connected to the hydraulic pump P2, a boom sub-side supply oil passage 20, a rotary oil supply passage 21, and a stick main-side supply oil passage 22 are branched and formed a state of being parallel with each other. The boom main-side supply oil passage 17 and the boom sub-side supply oil passage 20 are oil passages connecting the hydraulic pumps P1 and P2 to a pump port 23*p* of a boom directional switching valve 23 described later; the stick main-side supply oil passage 22 and the stick sub-side supply oil passage 18 are oil passages connecting the hydraulic pumps P2 and P1 to the pump port 25*p* of the stick directional switching valve 25; the rotary supply oil passage 21 is an oil passage connecting the hydraulic pump P2 to the pump port 24*p* of the rotary directional switching valve 24; and the bucket supply oil passage 19 is an oil passage connecting the hydraulic pump P1 to the pump port 26*p* of the bucket directional switching valve 26.

A stick flow rate control valve 28 for controlling the supply flow rate from the hydraulic pump P1 to the stick directional switching valve 25 is disposed in the stick sub-side supply oil passage 18, and a boom flow rate control valve 29 for controlling the supply flow rate from the hydraulic pump P2 to the boom directional switching valve 23 is disposed in the boom sub-side supply oil passage 20. The stick flow rate control valve 28 and the boom flow rate control valve 29 are poppet valves for performing the flow rate control and the pilot operation by a stick flow rate control electromagnetic proportional valve 45 and a boom flow rate control electromagnetic proportional valve 46 (shown in FIG. 3) which are operating based on the control signal output from the controller 10, and has a reverse flow preventing function, allowing the flow of oil from the hydraulic pumps P1 and P2 to the stick directional switching valve 25 and the boom directional switching valve 23, but the reverse flow is prevented.

On the other hand, the flow rate control valves such as the stick flow rate control valve 28 and the boom flow rate control valve 29 described above are not disposed in the boom main-side supply oil passage 17, the bucket supply oil passage 19, the rotary supply oil passage 21, and the stick main-side supply oil passage 22, and the supply flow rate from the hydraulic pump P1 or the hydraulic pump P2 via the boom main-side supply oil passage 17, the bucket supply oil passage 19, the rotary supply oil passage 21, and the stick main-side supply oil passage 22 is directly supplied to the boom directional switching valve 23, the bucket directional switching valve 26, the rotary directional switching valve 24, and the stick directional switching valve 25 without flow rate control. In addition, check valves 30 are disposed in the boom main-side supply oil passage 17, the bucket supply oil passage 19, the rotary supply oil passage 21, and the stick main-side supply oil passage 22, respectively, and the flow of oil from the hydraulic pumps P1 and P2 to the boom directional switching valve 23, the bucket directional switching valve 26, the rotary directional switching valve 24, and the stick directional switching valve 25 is permitted, but the reverse flow is prevented.

Thus, the hydraulic oil from the hydraulic pump P1 passing through the boom main-side supply oil passage 17 and the hydraulic oil from the hydraulic pump P2 passing through the boom sub-side supply oil passage 20 can be supplied to the pump port 23*p* of the boom directional switching valve 23, and the hydraulic oil from the hydraulic pump P2 is supplied to the boom directional switching valve 23 in a state (including a cut-off state) of the flow rate being controlled by the boom flow rate control valve 29 disposed in the boom sub-side supply oil passage 20. Further, the hydraulic oil from the hydraulic pump P2 passing through the stick main-side supply oil passage 22 and the hydraulic oil from the hydraulic pump P1 passing through the stick sub-side supply oil passage 18 can be supplied to the pump port 25*p* of the stick directional switching valve 25, and the hydraulic oil from the hydraulic pump P1 is supplied to the stick directional switching valve 25 in a state (including a cut-off state) of the flow rate being controlled by the stick flow rate control valve 28 disposed in the stick sub-side supply oil passage 18.

Next, the directional switching valves for the boom, rotary, stick and bucket 23 to 26 will be described.

First, a description will be given of the bucket and rotary directional control valves 26 and 24 supplied from the hydraulic pump P1 or P2. The bucket directional switching valve 26 is a closed-center spool valve that controls the supply/discharge flow rate to the bucket cylinder 9 and switches the supply/discharge direction, and includes pilot ports 26*a* and 26*b* on an expansion side and a contraction side respectively connected to bucket expansion-side and contraction-side electromagnetic proportional valves 44*a* and 44*b* (shown in FIG. 3), a pump port 26*p* connected to the bucket supply oil passage 19, a tank port 26*t* connected to the tank line T leading to the oil tank 3, one actuator port 26*c* connected to the head-side port 9*a* of the bucket cylinder 9, and the other actuator port 26*d* connected to the rod side port 9*b* of the bucket cylinder 9 for outputting pilot pressure based on a control signal output from the controller 10. Then, the bucket directional switching valve 26 is positioned at the neutral position N in which the supply/discharge control is not performed for the bucket cylinder 9 in a state in which the pilot pressure is not input to both the extension-side and contraction-side pilot ports 26*a* and 26*b*, but is switched to the extension side operation position X by inputting the pilot pressure to the extension-side pilot port 26*a*, then the supply valve passage 26*e* from the pump port 26*p* to the one actuator port 26*c* and the discharge valve passage 26*f* from the other actuator port 26*d* to the tank port 26*t* are opened, and then is switched to the contraction-side operation position Y by inputting the pilot pressure to the contraction side pilot port 26*b*, then the supply valve passage 26*e* from the pump port 26*p* to the one actuator port 26*c* and the discharge valve passage 26*f* from the other actuator port 26*d* to the tank port 26*t* are opened.

Then, the supply flow rate and the discharge flow rate to the bucket cylinder 9 when the bucket cylinder 9 is positioned at the extension-side operation position X or the contraction-side operation position Y are controlled by the opening areas of the supply valve passage 26*e* and the discharge valve passage 26*f*, and the opening areas are controlled to increase or decrease in accordance with the spool movement position accompanying the increase or decrease of the pilot pressure output from the bucket extension-side and contraction-side electromagnetic proportional valves 44*a* and 44*b* to the extension-side and contraction-side pilot ports 26*a* and 26*b*.

The rotary directional switching valve 24 is a closed-center spool valve performing supply/discharge flow rate control to the rotary motor 7 to switch the supply/discharge direction, and includes pilot ports 24*a* and 24*b* on the left and right rotary sides respectively connected to the left and right rotary electromagnetic proportional valves 42*a* and 42*b* (shown in FIG. 3), a pump port 24*p* connected to the rotary supply oil passage 21, a tank port 24*t* connected to the tank line T, one actuator port 24*c* connected to the left rotary side port 7*a* of the rotary motor 7, and the other actuator port 24*d* connected to the right rotary side of the rotary motor 7, which output pilot pressure based on a control signal output from the controller 10.

The rotary directional switching valve 24 has the same structure as the bucket directional switching valve 26 described above, and is configured to open a supply valve passage 24*e* from the pump port 24*p* to the actuator port 24*c* or 24*d* and a discharge valve passage 24*f* from the actuator port 24*d* or 24*c* to the tank port 24*t* by switching from the neutral position N to the left rotary side operation position X and the right rotary side operation position Y, and then the supply flow rate and the discharge flow rate to the rotary motor 7 are controlled by the opening area of the supply valve passage 24*e* and the discharge valve passage 24*f*, and the opening area is controlled to increase or decrease in accordance with the spool movement position accompanying the increase or decrease of the pilot pressure output from the left rotary side and right rotary side electromagnetic proportional valves 42*a* and 42*b*.

Next, there provides the description of the boom and stick directional switching valves 23 and 25 for hydraulic oil supplied from both the hydraulic pumps P1 and P2. The boom directional switching valve 23 is a closed-center spool valve that controls the supply/discharge flow rate to the boom cylinder 6 and switches the supply/discharge direction, and includes expansion-side and contraction-side pilot ports 23*a* and 23*b* respectively connected to the boom expansion-side and contraction-side electromagnetic proportional valves 41*a* and 41*b* (shown in FIG. 3), a pump port 23*p* connected to the boom main-side supply oil passage 17 and the boom sub-side supply oil passage 20, a tank port 23*t* connected to the tank line T, one actuator port 23*c* connected to the head side port 6*a* of the boom cylinder 6, and the other actuator port 23*d* connected to the rob side port 6*b* of the boom cylinder 6, which output pilot pressure based on a control signal output from the controller 10.

Then, the boom directional switching valve 23 is positioned at the neutral position N in which the supply/discharge control is not performed with respect to the boom cylinder 6 in a state in which the pilot pressure is not input to both the pilot ports 23*a* and 23*b* on the extension side and the contraction side, but is switched to the extension side operation position X by the input of the pilot pressure to the extension-side pilot port 23*a* and opens the supply valve passage 23*e* from the pump port 23*p* to the one actuator port 23*c* and the discharge valve passage 23*f* from the other actuator port 23*d* to the other actuator port 23*t*, and it is switched to the contraction-side operation position Y by the input of the pilot pressure to the contraction-side pilot port 23*b*, and opens a discharge valve passage 23*f* from the one actuator port 23*c* to the tank port 23*t*. Then, the opening areas of the supply valve passage 23*e* and the discharge valve passage 23*f* are controlled to increase or decrease in accordance with the movement position of the spool moved by the pilot pressure output from the boom extension-side and contraction-side electromagnetic proportional valves 41*a* and 41*b*, and the discharge flow rate from the boom cylinder 6 is controlled by the opening areas of the discharge valve passage 23*f*. Further, the supply flow rate from the hydraulic pump P1 to the boom cylinder 6 is controlled by the opening area of the supply valve passage 23*e* of the boom directional switching valve 23, while the supply flow rate from the hydraulic pump P2 is controlled by the opening area of the boom flow rate control valve 29 and the opening area of the supply valve passage 23*e* of the boom directional switching valve 23.

In addition, the stick directional switching valve 25 is a closed-center spool valve that controls the supply/discharge flow rate for the stick cylinder 8 and switches the supply/discharge direction, and includes pilot ports 25*a* and 25*b* on the expansion side and contraction side respectively connected to the stick expansion-side and contraction-side electromagnetic proportional valves 43*a* and 43*b* (shown in FIG. 3), a pump port 25*p* connected to the stick main-side supply oil passage 22 and the stick sub-side supply oil passage 18, a tank port 25*t* connected to the tank line T, one actuator port 25*c* connected to the head-side port 8*a* of the stick cylinder 8, and the other actuator port 25*d* connected to the rod side port 8*b* of the stick cylinder 8, which output pilot pressure based on a control signal output from the controller 10. The stick directional switching valve 25 has the same structure as the boom directional switching valve 23 described above, and is configured to open a supply valve passage 25*e* from the pump port 25*p* to the actuator port 25*c* or 25*d* and a discharge valve passage 25*f* from the actuator port 25*d* or 23*c* to the tank port 25*t* by switching from the neutral position N to the extension-side operation position X and the contraction-side operation position Y. Then, the opening areas of the supply valve passage 25*e* and the discharge valve passage 25*f* are controlled to increase or decrease in accordance with the movement position of the spool moved by the pilot pressure output from the stick extension-side and contraction-side electromagnetic proportional valves 43*a* and 43*b*, and the discharge flow rate from the stick cylinder 8 is controlled by the opening area of the discharge valve passage 25*f*. Further, the supply flow rate from the hydraulic pump P2 to the stick cylinder 8 is controlled by the opening area of the supply valve passage 25*e* of the stick directional switching valve 25, while the supply flow rate from the hydraulic pump P1 is controlled by the opening area of the stick flow rate control valve 28 and the opening area of the supply valve passage 25*e* of the stick directional switching valve 25.

The stick and boom flow rate control valves 28 and 29, and the boom, rotary, stick and bucket directional switching valves 23 to 26 correspond to the control valves of the present invention.

Figure 3:
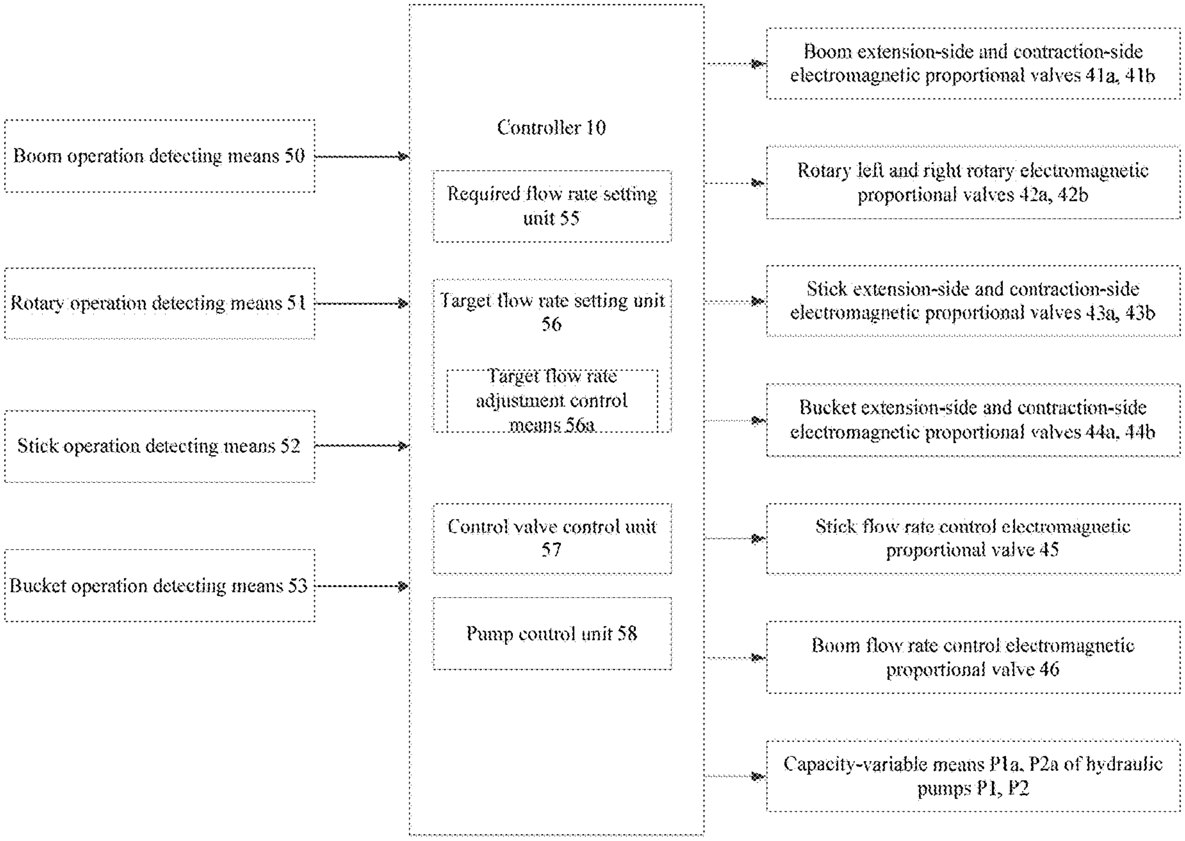
FIG. 3 is a block diagram showing input/output of a controller.

On the other hand, as shown in the block diagram of FIG. 3, the controller 10 (which corresponds to the control device of the present invention) is, at an input side, connected to a boom operation detecting means 50 for detecting the operation direction and the operation amount of the boom operation tool, a rotary operation detecting means 51 for detecting the operation direction and the operation amount of the rotary operation tool, a stick operation detecting means 52 for detecting the operation direction and the operation amount of the stick operation tool, a bucket operation detecting means 53 for detecting the operation direction and the operation amount of the bucket operation tool, and a plurality of pressure sensors for detecting the discharge pressure of the hydraulic pumps P1 and P2 and the load pressure of the hydraulic actuators (the boom cylinder 6, the rotary motor 7, the stick cylinder 8 and the bucket cylinder 9, although not shown in the figure, respectively, and at an output side, connect to the boom extension-side and contraction-side electromagnetic proportional valves 41*a* and 41*b* for respectively outputting pilot pressure to the pilot ports 23*a*, 23*b* to 26*a* and 26*b* of the boom, rotary, stick, and bucket directional switching valves 23 to 26, the rotary left rotary side and right rotary side electromagnetic proportional valves 42*a* and 42*b*, the stick extension-side and contraction-side electromagnetic proportional valves 43*a* and 43*b*, the bucket extension-side and contraction-side electromagnetic proportional valves 44*a* and 44*b*, the stick flow rate control electromagnetic proportional valve 45 for outputting pilot pressure to the stick flow rate control valve 28 disposed in the stick sub-side supply oil passage 18, the boom flow rate control electromagnetic proportional valve 46 for outputting pilot pressure to the boom flow rate control valve 29 disposed in the boom sub-side supply oil passage 20, the displacement variable means P1*a* and P2*a* of the hydraulic pumps P1 and P2. The controller 10 includes various control units, such as a required flow rate setting unit 55, a target flow rate setting unit 56, a control valve control unit 57, and a pump control unit 58, which will be described later, and is configured to perform oil supply and discharge control of the hydraulic actuators 6 to 9, discharge flow rate control of the hydraulic pumps P1 and P2, and the like on the basis of the control performed by these control units. The boom, rotary, stick and bucket operation tools correspond to the hydraulic actuator operation means of the present invention. In addition, the controller 10 also performs the switching control of the above-described running straight valve 11 and the oil supply/discharge control to the left and right running motors 4 and 5, but the description of the control will be omitted here.

Next, the control performed by the controller 10 will be described.

When a detection signal is input from each of the boom, rotary, stick and bucket operation detecting means 50 to 53, the controller 10 first determines the required flow rate required by each of the boom cylinder 6, the rotary motor 7, the stick cylinder 8, and the bucket cylinder 9 from the hydraulic cylinders P1, P2 in accordance with the operation direction and the operation amount of each operation means. In this case, the relationship between the operation amount of the operation tool and the required flow rate is set in advance for each hydraulic actuator by a graph, a map, or the like (see FIG. 4), and on the basis of the set relationship, the required flow rate for the hydraulic pump P1 or P2 serving as the hydraulic supply source is obtained for the hydraulic actuator using either of the hydraulic pumps P1 and P2 as the hydraulic supply source, and the required flow rate for both of the hydraulic pumps P1 and P2 is obtained for the hydraulic actuator using both of the hydraulic pumps P1 and P2 as the hydraulic supply sources. That is, in the present embodiment, the required flow rate for the hydraulic pump P1 (the bucket cylinder P1 required flow rate Q (P1) reqBK) is obtained for the bucket cylinder 9; the required flow rate for the hydraulic pump P2 (the rotary motor P2 required flow rate Q (P2) reqSW) is obtained for the rotary motor; and the required flow rates for the hydraulic pumps P1 and P2 (the boom cylinder P1 required flow rate Q (P1) reqBM, the boom cylinder P2 required flow rate Q (P1) reqSK, and the stick cylinder P2 required flow rate Q (P2) reqSK) are obtained for the boom cylinder 6 and the stick cylinder 8, respectively, but in this case, the required flow rates are set so as not to exceed the maximum discharge flow rates (Q (P1) max, Q (P2) max) for the boom cylinder 6 and the stick cylinder 8, respectively. Further, the controller 10 obtains a total P1 required flow rate Q (P1) toreq and a total P2 required flow rate Q (P2) toreq, which are the sum of the required flow rates required by the operated hydraulic actuator from the hydraulic pumps P1 and P2 serving as hydraulic pressure supply sources, respectively.

Figure 4A:
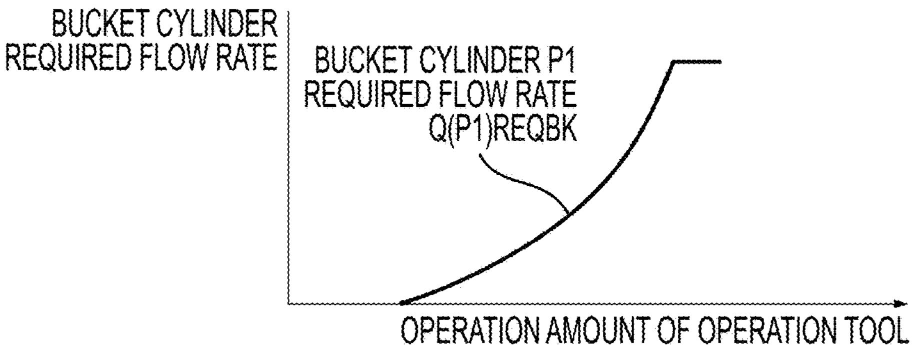
FIGS. 4(*a*), 4(*b*), 4(*c*) and 4(*d*) are diagrams showing relationships between an operation amount of an operation tool of a bucket cylinder, the rotary motor, the boom cylinder, and the stick cylinder, and the required flow rate, respectively.
Figure 4B:
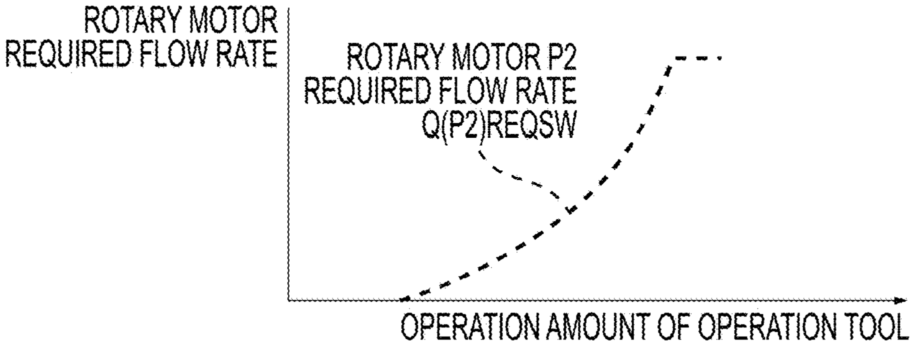
Figure 4C:
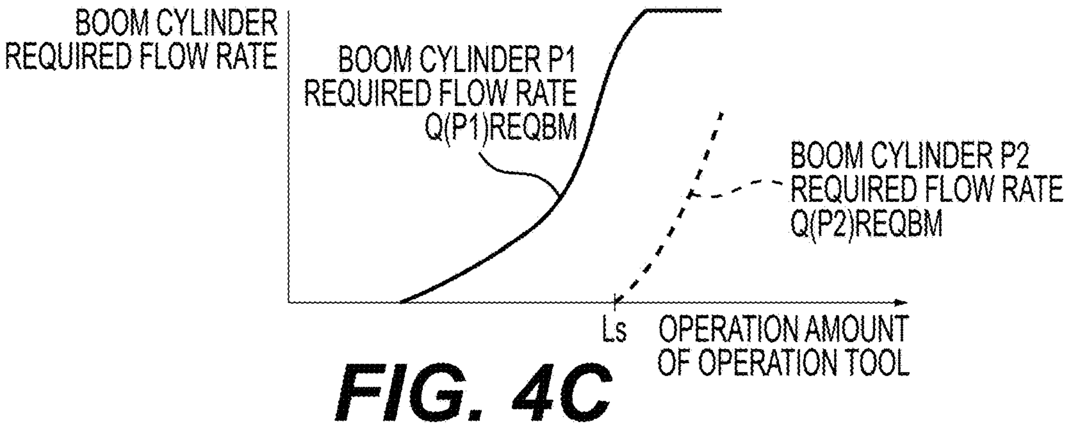
Figure 4D:
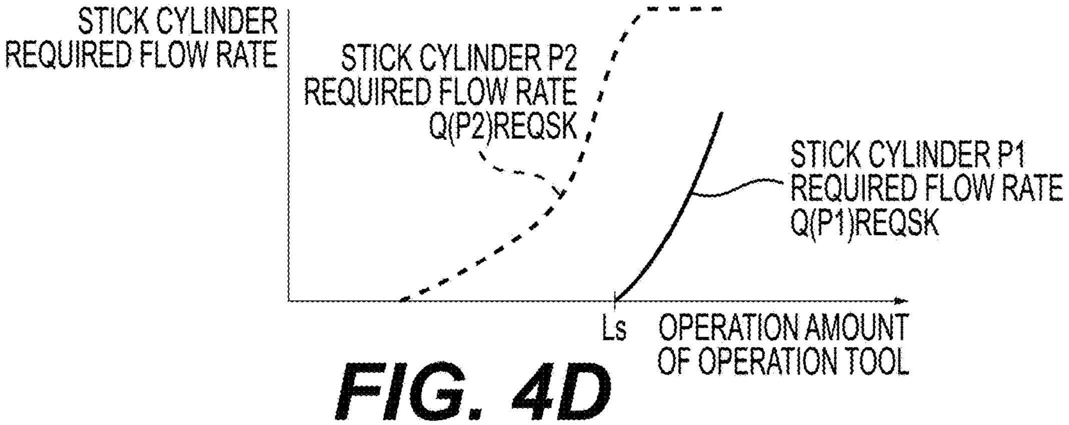

Here, as shown in FIGS. 4(C) and 4(D), with respect to the boom cylinder 6 and the stick cylinder 8 using both the hydraulic pumps P1 and P2 as hydraulic supply sources, when the operation amount of the operation tool is less than a preset set operation amount Ls (the set operation amount Ls is set to 75% when the maximum operation amount is set to 100%, for example, but is set individually by the boom cylinder 6 and the stick cylinder 8), the hydraulic oil is first supplied only from either one of the hydraulic pumps P1 or P2 (the hydraulic pump that supplies the hydraulic oil to the boom main-side supply oil passage 17 or the stick main-side supply oil passage 22), and when the operation amount increases to be equal to or greater than the set operation amount Ls, the hydraulic oil is supplied from the other hydraulic pump P2 or P1 (the hydraulic pump that supplies the hydraulic oil to the boom sub-side supply oil passage 20 or the stick sub-side supply oil passage 18). That is, only the boom cylinder P1 required flow rate Q (P1) reqBM is set when the operation amount of the boom operation tool is less than the set operation amount Ls, and the boom cylinder P1 required flow rate Q (P1) reqBM and the boom cylinder P2 required flow rate Q (P2) reqBM are set when the operation amount of the operation amount of the boom operation tool is an operation amount being equal to or greater than the set operation amount Ls; in addition, only the stick cylinder P2 required flow rate Q (P2) reqSK is set when the operation amount of the stick operation tool is less than the set operation amount Ls, and the stick cylinder P2 required flow rate Q (P2) reqSK and the stick cylinder P1 required flow rate Q (P1) reqSK are set when the operation amount of the stick operation tool is an operation amount being equal to or greater than the set operation amount Ls. In this case, as shown in FIG. 4, by setting an operation range in which the hydraulic oil is supplied only from one hydraulic pump (the operation range being less than the set operation amount Ls) to be large, the operation range in which the hydraulic oil is supplied from both the hydraulic pumps P1 and P2 becomes a narrow range close to the full operation (the maximum operation amount) even in the case of a hydraulic actuator using both the hydraulic pumps P1 and P2 as the hydraulic supply sources, so that the frequency of merging of the hydraulic oil supplied from the two hydraulic pumps P1 and P2 can be reduced, and the decrease in efficiency and the deterioration in operability caused by the merging can be reduced.

The hydraulic pumps P1 and P2 of the present embodiment are the first hydraulic pump or the second hydraulic pump of the present invention in accordance with the hydraulic actuators A and B. For example, in the present embodiment, when the bucket cylinder 9 is used as the hydraulic actuator A of the present invention; the hydraulic pump P1 serving as the hydraulic supply source of the bucket cylinder 9 corresponds to the first hydraulic pump of the present invention; the boom cylinder 6 to which both the hydraulic pumps P1 and P2 are used as hydraulic supply sources and the hydraulic pump P2 to which the hydraulic oil is first supplied from the hydraulic pump P1 corresponds to the hydraulic actuator B of the present invention; and the hydraulic pump P2 to which the hydraulic oil is supplied in accordance with the increase of the operation amount corresponds to the second hydraulic pump of the present invention. Further, in a case where the rotary motor 7 is used as the hydraulic actuator A of the present invention, the hydraulic pump P2 serving as the hydraulic supply source of the rotary motor 7 corresponds to the first hydraulic pump of the present invention, and the stick cylinder 8 to which both of the hydraulic pumps P1 and P2 are used as the hydraulic oil supply sources and to which the hydraulic oil is first supplied from the hydraulic pump P2 corresponds to the hydraulic actuator B of the present invention, and the hydraulic pump P1 that supplies the hydraulic oil to the stick cylinder 8 in accordance with an increase of the operation amount corresponds to the second hydraulic pump of the present invention.

Further, the controller 10 sets a target flow rate for each hydraulic actuator from the hydraulic pumps P1 and P2 in the target flow rate setting unit 56 on the basis of the required flow rate of each hydraulic actuator (the boom cylinder 6, the rotary motor 7, the stick cylinder 8, and the bucket cylinder 9) set by the required flow rate setting unit 55. In order to supply the target flow rate to each hydraulic actuator, the control valve control unit 57 controls the opening area of the directional switching valves 23 to 26 and the flow rate control valves 28 and 29, and also controls the discharge flow rate of the hydraulic pumps P1 and P2 in the pump control unit 58.

When setting the target flow rate in the target flow rate setting unit 56, the controller 10 executes normal control in a case where the operation tools for the hydraulic actuators are operated independently. In the normal control, the required flow rate of each of the above described hydraulic actuators is set as a target flow rate.

That is, when each hydraulic actuator operation tool (the operation tool for the bucket, rotary, boom and stick) is operated independently, the above mentioned required flow rates (the bucket cylinder P1 required flow rate Q (P1) reqBK, the rotary motor P2 required flow rate Q (P2) reqSW, the boom cylinder P1 required flow rate Q (P1) reqBM, the boom cylinder P2 required flow rate Q (P2) reqBM, the stick cylinder P1 required flow rate Q (P2) reqSK) is set as the target flow rate for the hydraulic pumps P1 and P2 (the bucket cylinder P1 target flow rate Q (P1) tgBK, the rotary motor P2 target flow rate tgSW, the boom cylinder P1 target flow rate Q(P1)tgBM, the boom cylinder P2 target flow rate Q (P2) tgBM, the stick cylinder P1 target flow rate Q (P1) tgSK, and the stick cylinder P2 target flow rate Q(P2)tgSK). In this case, since the target flow rate is equal to the required flow rate, and each of the required flow rates is smaller than the maximum discharge flow rates of the hydraulic pumps P1 and P2 as described above, the required flow rate required by the operation amount of the operation tool is supplied to the operated hydraulic actuators, whereby each of the hydraulic actuators can be operated at the speed required by the operation amount of the operation tool.

Figure 5:
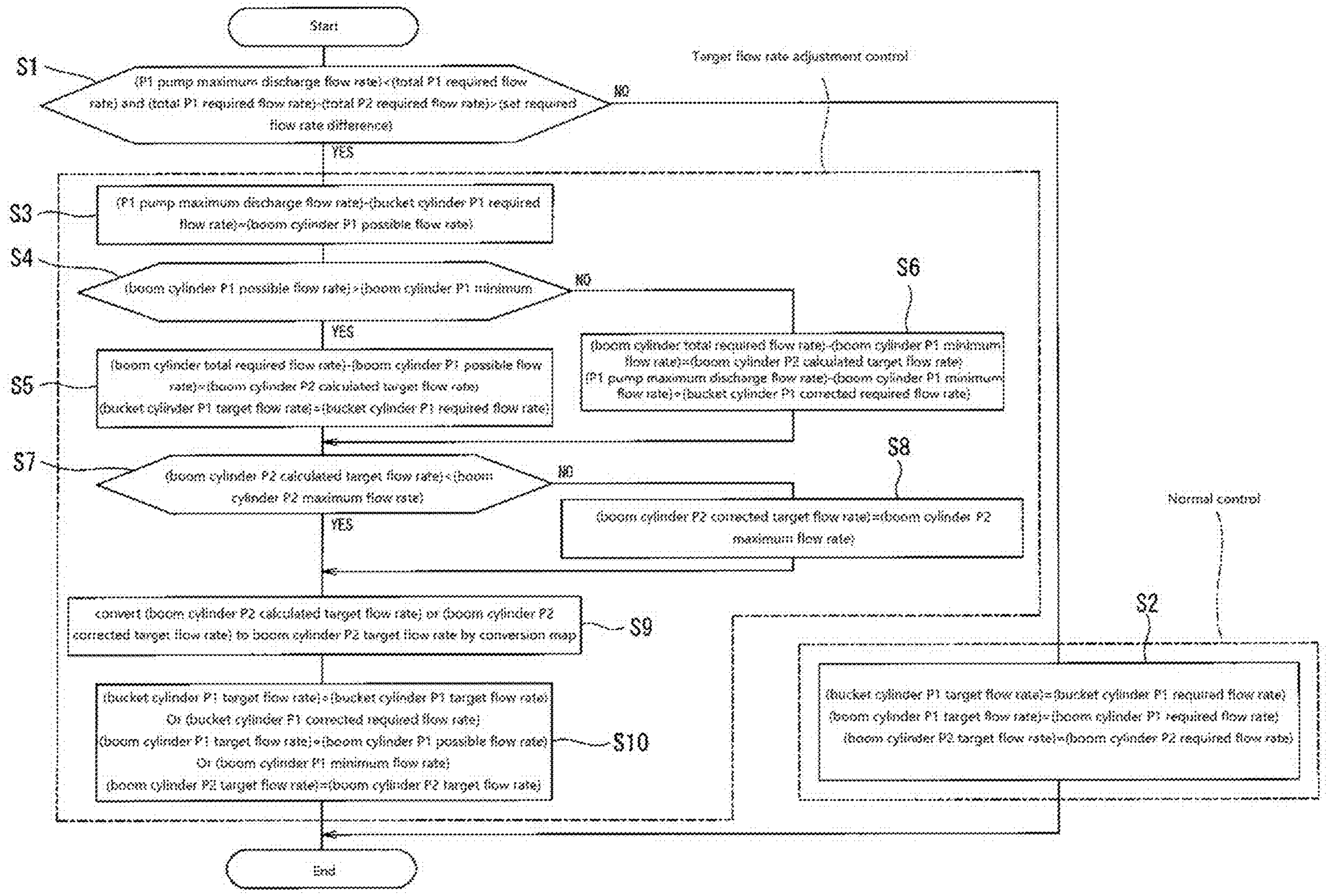
FIG. 5 is a flowchart showing a control procedure of the target flow rate setting unit.

On the other hand, when the two or more hydraulic actuator operation tools are operated simultaneously (composite operation), the controller 10 executes the normal control or the target flow rate adjustment control described later in accordance with the required flow rate of the operated hydraulic actuator. The target flow rate adjustment control is carried out by the target flow rate adjustment control means **56*a* incorporated in the target flow rate setting unit 56, and these controls will be described with reference to the flow chart shown in FIG. 5** taking the case where the bucket operation tool and the boom operation tool are operated simultaneously.

In a case where the bucket operation tool and the boom operation tool are operated at the same time, the controller 10 sets the bucket cylinder P1 required flow rate Q (P1) reqBK and the boom cylinder P1 required flow rate Q (P1) reqBM as the required flow rate for the hydraulic pump P1 in the required flow rate setting unit 55, and sets the boom cylinder P2 required flow rate Q (P2) reqBM (only when the operation amount of the boom operation tool is equal to or greater than the set operation amount Ls) as the hydraulic pump P2 required flow rate. Further, a flow rate obtained by summing the bucket cylinder P1 required flow rate Q (P1) reqBK and the boom cylinder P1 required flow rate Q (P1) reqBM is set as the total P1 required flow rate Q (P1) toreq for the hydraulic pump P1, and a value of the boom cylinder P2 required flow rate Q (P2) reqBM is set as the total P2 required flow rate Q (P2) toreq for the hydraulic pump P2. Note that, when the operation tools for the other hydraulic actuators are operated simultaneously with the bucket operation tool and the boom operation tool, the total flow rates obtained by adding the required flow rates required by the other hydraulic actuators to the hydraulic pumps P1 and P2 serving as the hydraulic supply sources are set as the total P1 required flow rate Q (P1) toreq and the total P2 required flow rate Q (P2) toreq.

Also, when the bucket operation tool and the boom operation tool are operated at the same time, the bucket cylinder 9 and the boom cylinder 6 respectively correspond to the hydraulic actuator A and the hydraulic actuator B of the present invention; the bucket operation tool and the boom operation tool respectively correspond to the operation means for the hydraulic actuator A and the operation means for the hydraulic actuator B of the present invention; and the hydraulic pump P1 and P2 respectively correspond to the first and second hydraulic pump of the present invention. Correspondingly, the bucket cylinder P1 required flow rate Q (P1) reqBK corresponds to the actuator A first required flow rate of the present invention; the boom cylinder P1 required flow rate Q (P1) reqBM, the boom cylinder P2 required flow rate Q (P2) reqBM respectively correspond to the first required flow rate of the hydraulic actuator B and the second required flow rate of the hydraulic actuator B of the present invention; the boom cylinder total required flow rate QtoreqBM corresponds to the actuators B total required flow rate of the present invention; the P1 pump maximum discharge flow rate Q (P1) max corresponds to the first hydraulic pump maximum discharge flow rate of the present invention; and the total P1 required flow rate Q (P1) toreq, and the total P2 required flow rate Q (P2) toreq respectively correspond to the total first required flow rate and the total second required flow rate of the present invention. Further, the minimum flow rate Q (P1) of the boom cylinder P1 described later corresponds to the first minimum flow rate of the actuator B of the present invention, and the maximum flow rate Q (P2) of the boom cylinder P2 corresponds to the second maximum flow rate of the actuator B of the present invention.

On the other hand, in the present embodiment, the present invention is carried out not only when the bucket operation tool and the boom operation tool are simultaneously operated, but also when the rotary operation tool and the stick operation tool are operated at the same time. In this case, the rotary motor 7 and the stick cylinder 8 correspond to the hydraulic actuator A and the hydraulic actuator B of the present invention, respectively; the rotary operation tool and the stick operation tool correspond to the operation means for the hydraulic actuator A and the operation means for the hydraulic actuator B of the present invention; and the hydraulic pumps P2 and P1 correspond to the first and second hydraulic pumps of the present invention, respectively. Further in this case, the rotary motor P2 required flow rate Q (P2) reqSW corresponds to the actuator A first required flow rate of the present invention; the stick cylinder P2 required flow rate Q (P2) reqSK and the stick cylinder P1 required flow rate Q (P1) reqSK respectively correspond to the hydraulic actuator B first required flow rate and the hydraulic actuator B second required flow rate; the total flow rate of the stick cylinder P2 required flow rate Q (P2) reqSK and the stick cylinder P1 required flow rate Q (P1) reqSK corresponds to the actuator B total required flow rate of the present invention; the maximum discharge flow rate of the hydraulic pump P2 correspond to the maximum discharge flow rate of the first hydraulic pump of the present invention; and the total of the required flow rates for the hydraulic pumps P2 and P1 correspond to the total first required flow rate and the total second required flow rate of the present invention. Further, although the flow rate set in advance as the minimum supply flow rate from the hydraulic pump P2 to the stick cylinder 8 corresponds to the first minimum flow rate of the actuator B of the present invention, and the flow rate set in advance as the maximum supply flow rate from the hydraulic pump P1 to the stick cylinder 8 corresponds to the second maximum flow rate of the actuator B of the present invention, in order to make the description easier to understand, the following description will be given by taking the case where the bucket cylinder 9 and the boom cylinder 6 are the hydraulic actuator A and the hydraulic actuator B of the present invention as an example.

When the bucket operation tool and the boom operation tool are operated simultaneously, after setting the required flow rate, the controller 10 first determines in the target flow rate setting unit 56 whether the total of the bucket cylinder P1 required flow rate Q (P1) reqBK and the boom cylinder P1 required flow rate Q (P1) reqBM (total P1 required flow rate Q (P1) toreq) exceeds the maximum discharge flow rate of the hydraulic pump P1 (P1 pump maximum discharge flow rate Q (P1) max) (P1 pump maximum discharge flow rate<total P1 required flow rate?), and further determines whether a difference between the total P1 required flow rate Q (P1) toreq for the hydraulic pump P1 and the total P2 required flow rate Q (P2) toreq for the hydraulic pump P2 exceeds a preset set required flow rate difference DQreq (total P1 required flow rate-total P2 required flow rate>set required flow rate difference?) (Step S1). The set required flow rate difference DQreq is an adjustable value set to determine whether there is a large deviation between the total required flow rate for the hydraulic pump P1 and the total required flow rate for the hydraulic pump P2, and when the difference between the total P1 required flow rate Q (P1) toreq for the hydraulic pump P1 and the total P2 required flow rate Q (P2) toreq for the hydraulic pump P2 is equal to or less than the set required flow rate difference DQreq, it is determined that there is no large deviation between the required flow rate for the hydraulic pump P1 and the required flow rate for the hydraulic pump P2, and when the set required flow rate difference DQreq is exceeded, it is determined that there is a large deviation (step S1).

Then, when one of the two determinations in step S1 is "NO" or both of them are "NO", that is, when the total P1 required flow rate Q (P1) toreq (the sum of the bucket cylinder P1 required flow rate Q (P1) reqBK and the boom cylinder P1 required flow rate Q (P1) reqBM) does not exceed the maximum discharge flow rate Q (P1) max of the hydraulic pump P1, or when it is determined that the difference between the total P1 required flow rate Q (P1) toreq and the total P2 required flow rate Q (P2) toreq is equal to or less than the set required flow rate difference DQreq and there is no large deviation, the normal control for setting the required flow rate of each hydraulic actuator described above as the target flow rate is executed (step S2).

That is, in step S2, the bucket cylinder P1 required flow rate Q (P1) reqBK is set as the target flow rate from the hydraulic pump P1 to the bucket cylinder 9 (the bucket cylinder P1 target flow rate Q (P1) tgBK); the boom cylinder P1 required flow rate Q (P1) reqBM is set as the target flow rate from the hydraulic pump P1 to the boom cylinder 6 (the boom cylinder P1 target flow rate Q (P1) tgBM); and the boom cylinder P2 required flow rate Q (P2) reqBM is set as the target flow rate from the hydraulic pump P2 to the boom cylinder 6 (the boom cylinder P2 target flow rate Q (P2) tgBM) (the bucket cylinder P1 target flow rate=the bucket cylinder P1 required flow rate, the boom cylinder P1 target flow rate=the boom cylinder P1 required flow rate, the boom cylinder target flow rate=the boom cylinder P2 required flow rate).

In the normal control of step S2, when the sum of the bucket cylinder P1 required flow rate Q (P1) reqBK and the boom cylinder P1 required flow rate Q (P1) reqBM exceeds the maximum discharge flow rate Q (P1) max of the hydraulic pump P1, the P1 pump maximum discharge flow rate Qmax (P1) is proportionally divided according to the ratio of the respective required flow rates Q (P1) reqBK and Q (P1) reqBM, and the proportionally divided flow rates are set as the bucket cylinder P1 target flow rate (P1) tgBK, the boom cylinder P1 target flow rate Q (P1) tgBM.

On the other hand, when both of the two determinations in step S1 are "YES", that is, when it is determined that the total P1 required flow rate Q (P1) toreq (the sum of the bucket cylinder P1 required flow rate Q (P1) reqBK and the boom cylinder P1 required flow rate Q (P1) reqBM) exceeds the maximum discharge flow rate Q (P1) max of the hydraulic pump P1, and the difference between the total P1 required flow rate Q (P1) toreq and the total P2 required flow rate Q (P2) toreq exceeds the set required flow rate difference DQreq and there is a large deviation, the target flow rate adjustment control shown in steps S3 to S10 described later is executed.

In the target flow rate adjustment control, first, the bucket cylinder P1 required flow rate Q (P1) reqBK is subtracted from the P1 pump maximum discharge flow rate Q (P1) max, and the subtracted value is set as the boom cylinder P1 possible flow rate Q (P1) avaBM (the P1 pump maximum pump flow rate−the bucket cylinder P1 required flow rate=the boom cylinder P1 possible flow rate) (step S3).

Subsequently, it is determined whether or not the boom cylinder P1 possible flow rate Q (P1) avaBM set in step S3 is larger than the boom cylinder P1 preset minimum flow rate Q (P1) minBM (the boom cylinder P1 possible flow rate>the boom cylinder P1 minimum flow rate) (step S4). The boom cylinder P1 minimum flow rate Q (P1) minBM is a minimum flow rate which is assured as a supply flow rate from the hydraulic pump P1 to the boom cylinder 6 when the target flow rate adjustment control is executed, and is a preset adjustable value.

When "YES" is determined in step S4, that is, when the boom cylinder P1 possible flow rate Q (P1) avaBM is larger than the boom cylinder P1 minimum flow rate Q (P1) minBM, a value obtained by subtracting the boom cylinder P1 possible flow rate Q (P1) avaBM from the boom cylinder total required flow rate QtoreqBM (the sum of the boom cylinder P1 required flow rate Q (P1) reqBM and the boom cylinder P2 required flow rate Q (P2) reqBM) is set as the boom cylinder P2 calculated target flow rate Q (P2) catgBM (the boom cylinder total required flow rate−the boom cylinder P1 possible flow rate=the boom cylinder P2 calculated target flow rate). Further, the bucket cylinder P1 required flow rate Q (P1) reqBK is set as the bucket cylinder P1 target flow rate Q (P1) tgBK (the bucket cylinder P1 target flow rate=the bucket cylinder P1 required flow rate) (step S5). After the processing of step S5, the process proceeds to step S7.

On the other hand, when "NO" is determined in step S4, that is, when the boom cylinder P1 possible flow rate Q (P1) avaBM is equal to or less than the boom cylinder P1 minimum flow rate Q (P1) minBM, a value obtained by subtracting the boom cylinder P1 minimum flow rate Q (P1) minBM from the boom cylinder total required flow rate QtoreqBM is set as the boom cylinder P2 calculated target flow rate Q (P2) catgBM (the boom cylinder total required flow rate−the boom cylinder P1 minimum flow rate=the boom cylinder P2 calculated target flow rate). Further, a value obtained by subtracting the boom cylinder P1 minimum flow rate Q (P1) minBM from the P1 pump maximum discharge flow rate Q (P1) max is set as the bucket cylinder P1 corrected required flow rate Q (P1) coreqBK (the P1 pump maximum discharge flow rate−the boom cylinder P1 minimum flow rate=the bucket cylinder P1 corrected required flow rate) (step S6). Thus, when the boom cylinder P1 possible flow rate Q (P1) avaBM is equal to or less than the boom cylinder P1 minimum flow rate Q (P1) minBM, the target flow rate first correction control for correcting the setting of the target flow rate is performed using the boom cylinder P1 minimum flow rate Q (P1) minBM, but the target flow rate first correction control will be described later. After the processing of step S6, the process proceeds to step S7.

In step S7, it is determined whether the boom cylinder P2 calculated target flow rate Q (P2) catgBM set in step S5 or step S6 is smaller than the boom cylinder P2 maximum flow rate Q (P2) maxBM set in advance (the boom cylinder P2 calculated target flow rate<the boom cylinder P2 maximum flow rate?). The boom cylinder P2 maximum flow rate Q (P2) maxBM is a maximum flow rate that the hydraulic pump P2 can supply to the boom cylinder 6 when the target flow rate adjustment control is executed, and is a preset adjustable value.

If "YES" is determined in step S7, that is, when the boom cylinder P2 calculated target flow rate Q (P2) catgBM is smaller than the boom cylinder P2 maximum flow rate Q (P2) maxBM, the process proceeds to step S9 described later.

On the other hand, when the determination in step S7 is "NO", that is, when the boom cylinder P2 calculated target flow rate Q (P2) catgBM is equal to or greater than the boom cylinder P2 maximum flow rate Q (P2) maxBM, the boom cylinder P2 maximum flow rate Q (P2) maxBM is set as the boom cylinder P2 corrected target flow rate Q (P2) cotgBM (the boom cylinder P2 corrected target flow rate=the boom cylinder P2 maximum flow rate) (step S8). Thus, when the boom cylinder P2 calculated target flow rate Q (P2) catgBM is equal to or greater than the boom cylinder P2 maximum flow rate Q (P2) maxBM, the target flow rate second correction control for correcting the setting of the target flow rate is performed using the boom cylinder P2 maximum flow rate Q (P2) maxBM, but the target flow rate second correction control will be described later. After the processing of step S8, the process proceeds to step S9.

In step S9, when proceeding from step S7 to step S9 without passing through step S8 (in the case of "YES" in the determination of step S7, that is, when the boom cylinder P2 calculated target flow rate Q (P2) catgBM is smaller than the boom cylinder P2 maximum flow rate Q (P2) maxBM), the boom cylinder P2 calculated target flow rate Q (P2) cotgBM is converted into the boom cylinder P2 target flow rate Q (P2) tgBM by using the conversion map, or when proceeding to step S9 via step S8 (in the case of "No" in the determination of step S7, that is, when the boom cylinder P2 calculated target flow rate Q(P2)catgBM is equal to or greater than the boom cylinder P2 maximum flow rate Q(P2)maxBM), the boom cylinder P2 corrected target flow rate Q(P2)cotgBM is converted into the boom cylinder P2 target flow rate Q (P2) tgBM by using the conversion map. The conversion map is a tuning parameter used to adjust the flow rate obtained by calculation to the actual flow rate.

After the processing of step S9, the process proceeds to step S10. In step S10, the bucket cylinder P1 target flow rate Q (P1) tgBK set in step S5 is set as the bucket cylinder P1 target flow rate Q (P1) tgBK, or the bucket cylinder P1 corrected required flow rate Q (P1) coreqBK set in step S6 is set as the bucket cylinder P1 target flow rate Q (P1) tgBK (the bucket cylinder P1 target flow rate=the bucket cylinder P1 target flow rate or the bucket cylinder P1 corrected required flow rate). That is, when it is determined that the boom cylinder P1 possible flow rate Q (P1) avaBM is larger than the boom cylinder P1 minimum flow rate Q (P1) minBM in the determination in step 4, the bucket cylinder P1 target flow rate Q (P1) tgBK set in step S5 is set as the bucket cylinder P1 target flow rate Q (P1) tgBK, and when it is determined that the boom cylinder P1 possible flow rate Q (P1) avaBM is equal to or less than the boom cylinder P1 minimum flow rate Q (P1) minBM, the bucket cylinder P1 corrected required flow rate Q (P1) coreqBK set in step S6 is set as the bucket cylinder P1 target flow rate Q (P1) tgBK.

Further, in step S10, the boom cylinder P1 possible flow rate Q (P1) avaBM is set as the boom cylinder P1 target flow rate Q (P1) tgBM when the determination in step S4 is "YES", that is, when the boom cylinder P1 possible flow rate Q (P1) avaBM is greater than the boom cylinder P1 minimum flow rate Q (P1) minBM; and the boom cylinder P1 minimum flow rate Q (P1) minBM is set as the boom cylinder P1 target flow rate Q (P1) tgBM (the boom cylinder P1 target flow rate=boom cylinder P1 possible flow rate or boom cylinder P1 minimum flow rate) when the determination in step S4 is "NO", that is, when the boom cylinder P1 possible flow rate Q (P1) avaBM is equal to or less than the boom cylinder P1 minimum flow rate Q (P1) minBM.

Further, in step 10, the boom cylinder P2 target flow rate Q (P2) tgBM obtained by using the conversion map in step 9 is set as the boom cylinder P2 target flow rate Q (P2) tgBM (the boom cylinder P2 target flow rate=the boom cylinder P2 target flow rate).

However, the target flow rate adjustment control is executed when in step S1 the total P1 required flow rate Q (P1) toreq exceeds the maximum discharge flow rate Q (P1) max of the hydraulic pump P1 and the difference between the total P1 required flow rate Q (P1) toreq and the total P2 required flow rate Q (P2) toreq exceeds the set required flow rate difference DQreq, but in the target flow rate adjustment control, when the target flow rate first correction control in step S6 and the target flow rate second correction control in step S8 are not executed, the bucket cylinder P1 required flow rate Q (P1) reqBK is set as the bucket cylinder P1 target flow rate Q (P1) tgBK (step S5, step S10); the boom cylinder P1 possible flow rate Q (P1) avaBM, which is a flow rate obtained by subtracting the bucket cylinder P1 required flow rate Q (P1) reqBK from the P1 pump maximum discharge flow rate Q (P1) max, is set as the boom cylinder P1 target flow rate Q (P1) tgBM (step S3, step S10); and the boom cylinder P2 calculated target flow rate Q (P2) catgBM, which is a flow rate obtained by subtracting the boom cylinder P1 possible flow rate Q (P1) avaBM (=the boom cylinder P1 target flow rate Q (P1) tgBM) from the boom cylinder total required flow rate QtoreqBM, is converted by a conversion map and then set as the boom cylinder P2 target flow rate Q (P2) tgBM (step S5, step S9, step S10).

On the other hand, when the boom cylinder P1 possible flow rate Q (P1) avaBM is equal to or less than the boom cylinder P1 minimum flow rate Q (P1) minBM, the target flow rate first correction control is executed, and in the target flow rate first correction control, a flow rate obtained by subtracting the boom cylinder P1 minimum flow rate Q (P1) minBM from the P1 pump maximum discharge flow rate Q (P1) max is set as the bucket cylinder P1 corrected required flow rate Q (P1) coreqBK, and the bucket cylinder P1 corrected required flow rate Q (P1) coreqBK is set as the bucket cylinder P1 target flow rate Q (P1) tgBK (step S6, step S10). In addition, the boom cylinder P1 minimum flow rate Q (P1) minBM is set as the boom cylinder P1 target flow rate Q (P1) tgBM (step S10). Further, a flow rate obtained by subtracting the boom cylinder P1 minimum flow rate Q (P1) minBM from the boom cylinder total required flow rate QtoreqBM is set as the boom cylinder P2 calculated target flow rate Q (P2) catgBM, and the boom cylinder P2 calculated target flow rate Q (P2) catgBM is converted by the conversion map and then set as the boom cylinder P2 target flow rate Q (P2) tgBM (step S6, step S9, step S10).

Further, when the boom cylinder P2 calculated target flow rate Q (P2) catgBM is equal to or greater than the boom cylinder P2 maximum flow rate Q (P2) maxBM, the target flow rate second correction control is executed, but in the target flow rate second correction control, the boom cylinder P2 maximum flow rate Q (P2) maxBM is set as the boom cylinder P2 corrected target flow rate Q (P2) cotgBM, and the boom cylinder P2 corrected target flow rate Q (P2) cotgBM is converted by the conversion map and then set as the boom cylinder P2 target flow rate Q (P2) tgBM (step S8, step S9, step S10).

In the present embodiment, the conversion map is used to adjust the flow rate obtained by calculation to the actual flow rate, but the conversion by the conversion map may be omitted.

In the present embodiment configured as described above, the hydraulic control system of the hydraulic excavator 1 includes hydraulic pumps P1 and P2, a plurality of hydraulic actuators 6 to 9 (boom cylinder 6, rotary motor 7, stick cylinder 8, and bucket cylinder 9) that drive at least one of the hydraulic pumps P1 and P2 as a hydraulic supply source, hydraulic actuator operation tools (boom, rotary, stick, and bucket operation tools) that are operated to drive the hydraulic actuators, control valves 23 to 26, 28, and 29 (boom, rotary, stick, and bucket directional switching valves 23 to 26, flow rate control valves 28, 29) that control the flow rate of hydraulic oil supplied from the hydraulic pumps P1 and P2 to the hydraulic actuators 6 to 9, and a controller 10 that obtains a target flow rate for each of the hydraulic actuators 6 to 9 from the hydraulic pumps P1 and P2 based on the operations of the hydraulic actuator operation tools and controls the control valves 23 to 26, 28, and 29 to supply the target flow rate to each of the hydraulic actuators 6 to 9, wherein the hydraulic actuators 6 to 9 include a bucket cylinder 9 (hydraulic actuator A) to which hydraulic oil is supplied only from the hydraulic pump P1 (first hydraulic pump) of the hydraulic pumps P1 and P2, and a boom cylinder 6 (hydraulic actuator B) to which hydraulic oil is supplied from both of the hydraulic pumps P1 and P2 when supplied at the time of maximum flow rate, and the boom cylinder 6 is set to be first supplied with hydraulic oil from the hydraulic pump P1 when the boom operation tool (hydraulic actuator B operation means) is operated, and is also supplied with hydraulic oil from the hydraulic pump P2 (second hydraulic pump) in addition to the hydraulic pump P1 in accordance with an increase in the operation amount.

Then, when the bucket operation tool (hydraulic actuator A operation means) and the boom operation tool are operated simultaneously, the controller 10 obtains a bucket cylinder P1 required flow rate Q (P1) reqBK (actuator A first required flow rate) required by the bucket cylinder 9 from the hydraulic pump P1 according to the operation amount of the bucket operation tool, boom cylinder P1, P2 required flow rates Q (P1) reqBM, Q (P2) reqBM (actuator B first and second required flow rates) required by the boom cylinder 6 from the hydraulic pumps P1 and P2 respectively according to the operation amount of the boom operation tool, and total P1 and P2 required flow rates Q (P1) toreq, Q (P2) toreq (total first and second required flow rates) that are the sum of the required flow rates required by the simultaneously operating hydraulic actuators including the bucket cylinder 9 and the boom cylinder 6, respectively, and a boom cylinder total required flow rate QtoreqBM (actuator B total required flow rate) which is the sum of the boom cylinder P1 required flow rate Q (P1) reqBM and the boom cylinder P2 required flow rate Q (P2) reqBM.

Further, in a case where the total P1 required flow rate Q (P1) toreq exceeds the maximum discharge flow rate Q (P1) max of the hydraulic pump P1 (first hydraulic pump maximum discharge flow rate) and a difference between the total P1 required flow rate Q (P1) toreq and the total P2 required flow rate Q (P2) toreq exceeds a preset set required flow rate difference DQreq, the controller 10 performs target flow rate adjustment control by target flow rate adjustment means **56*a* incorporated in a target flow rate setting unit 56, but in the target flow rate adjustment control, the bucket cylinder P1 required flow rate Q (P1) reqBK is set as a target flow rate from the hydraulic pump P1 to the bucket cylinder 9; a flow rate obtained by subtracting the bucket cylinder P1 required flow rate Q (P1) reqBK from the P1 pump maximum discharge flow rate Q (P1) max is set as the target flow rate from the hydraulic pump P1 to the boom cylinder 6; and a flow rate obtained by subtracting the target flow rate from the hydraulic pump P1 to the boom cylinder 6 from the boom cylinder total required flow rate QtoreqBM is set as the target flow rate from the hydraulic pump P2 to the boom cylinder 6**.

Thus, in the present embodiment, even if the total P1 required flow rate Q (P1) toreq required by the bucket cylinder 9 and the boom cylinder 6 from the hydraulic pump P1 exceeds the P1 pump maximum discharge flow rate Q (P1) max, for the bucket cylinder 9 using only the hydraulic pump P1 as the hydraulic supply source, the bucket cylinder P1 required flow rate Q (P1) reqBK required by the bucket cylinder 9 from the hydraulic pump P1 is set as the target flow rate from the hydraulic pump P1 to the bucket cylinder 9 by the target flow rate adjustment control performed by the target flow rate adjustment means 56*a*, and thus the bucket cylinder P1 required flow rate Q (P1) reqBK is supplied from the hydraulic pump P1 to the bucket cylinder 9. On the other hand, for the boom cylinder 6 using both the hydraulic pumps P1 and P2 as hydraulic supply sources, a flow rate obtained by subtracting the bucket cylinder P1 required flow rate Q (P1) reqBK from the P1 pump maximum discharge flow rate Q (P1) max is set as a target flow rate from the hydraulic pump P1 to the boom cylinder 6, and a flow rate obtained by subtracting the target flow rate from the hydraulic pump P1 to the boom cylinder 6 from the boom cylinder total required flow rate QtoreqBM is set as a target flow rate from the hydraulic pump P2 to the boom cylinder 6, so that the boom cylinder total required flow rate QtoreqBM is supplied to the boom cylinder 6 from both hydraulic pumps P1 and P2. As a result, the bucket cylinder 9 and the boom cylinder 6 are supplied with a required flow rate corresponding to the operation amount of the bucket operation tool and the boom operation tool, respectively, and both the bucket cylinder 9 and the boom cylinder 6 can be driven at an operation speed corresponding to the operation amount, thereby contributing to improvement of operability and improvement of work efficiency. Moreover, even if the target flow rate adjustment control is performed, the hydraulic oil is supplied to the bucket cylinder 9 only from the hydraulic pump P1 and not from the hydraulic pump P2, so that an increase in the merging frequency and a complication of the circuit can be avoided.

Furthermore, in this embodiment, the target flow rate adjustment means 56*a* performs the target flow rate first correction control when the flow rate obtained by subtracting the bucket cylinder P1 required flow rate Q (P1) reqBK from the P1 pump maximum discharge flow rate Q (P1) max is equal to or less than the boom cylinder P1 minimum flow rate Q (P1) minBM (hydraulic actuator B first minimum flow rate) set in advance as the minimum supply flow rate from the hydraulic pump P1 to the boom cylinder 6, but in the target flow rate first correction control, the flow rate obtained by subtracting the boom cylinder P1 minimum flow rate Q (P1) minBM from the P1 pump maximum discharge flow rate Q (P1) max; the boom cylinder P1 minimum flow rate Q (P1) minBM is set as the target flow rate from the hydraulic pump P1 to the boom cylinder 6; the flow rate obtained by subtracting the boom cylinder P1 minimum flow rate Q (P1) minBM from the boom cylinder total required flow rate QtoreqBM is corrected and set as the target flow rate from the hydraulic pump P2 to the boom cylinder 6. Thus, by ensuring the boom cylinder P1 minimum flow rate Q (P1) minBM set in advance as the minimum target flow rate from the hydraulic pump P1 to the boom cylinder 6, the minimum flow rate at which the hydraulic oil is supplied from the hydraulic pump P1 to the boom cylinder 6 can be ensured even if the required flow rate required by the bucket cylinder 9 is large, and it is not necessary to change the setting that when the boom operation tool is operated, the hydraulic oil is first supplied from the hydraulic pump P1 to the boom cylinder 6 and then from the hydraulic pump P2 in addition to the hydraulic pump P1 in accordance with an increase of the operation amount, and the complication of the control can be avoided.

Further, in this embodiment, the target flow rate adjustment means 56*a* performs the target flow rate second correction control when the target flow rate from the hydraulic pump P2 to the boom cylinder 6 is equal to or greater than the boom cylinder P2 maximum flow rate Q (P2) maxBM (actuator B second maximum flow rate) preset as the maximum supply flow rate from the hydraulic pump P2 to the boom cylinder 6, but in the target flow rate second correction control, the boom cylinder P2 maximum flow rate Q (P2) maxBM is corrected and set as the target flow rate from the hydraulic pump P2 to the boom cylinder 6. In this way, by performing the correction for limiting the target flow rate from the hydraulic pump P2 to the boom cylinder 6 so as not to exceed the preset boom cylinder P2 maximum flow rate Q (P2) maxBM, it is possible to ensure the supply hydraulic oil to the other hydraulic actuators even when other hydraulic actuators for the hydraulic pump P2 are operated simultaneously with the operation of the bucket operation tool and the boom operation tool.

It should be noted that the present invention is not limited to the above-described embodiments, and for example, the target flow rate correction control can be performed by expressing the required flow rate and the target flow rate by the operation amount of the hydraulic actuator operation means.

In addition, the present invention is not limited to the hydraulic excavator, and it is needless to say that the present invention can be applied to various types of work machines.

INDUSTRIAL APPLICABILITY

The present invention can be applied to a hydraulic control system of a working machine such as a hydraulic excavator.

What is claimed is:

1. A hydraulic control system in a working machine, the hydraulic control system comprising:

a first hydraulic pump, a second hydraulic pump, a plurality of hydraulic actuators using at least one of the hydraulic pumps as a hydraulic pressure supply source, hydraulic actuator operation means operated by each hydraulic actuator, a control valve for controlling a flow rate of hydraulic oil supplied from each hydraulic pump to each hydraulic actuator, and a control device for controlling the control valve to obtain a target flow rate from each hydraulic pump to each hydraulic actuator based on an operation of the hydraulic actuator operation means, and to supply the target flow rate to each hydraulic actuator, the plurality of hydraulic actuators including a hydraulic actuator A to which the hydraulic oil is supplied only from a first hydraulic pump of the first and second hydraulic pumps, and a hydraulic actuator B to which the hydraulic oil is supplied from both the first and second hydraulic pumps when a maximum flow rate is supplied, and the hydraulic actuator B is set to be supplied with the hydraulic oil from the first hydraulic pump when the hydraulic actuator B operation means is operated, and to be supplied with the hydraulic oil from the second hydraulic pump in addition to the first hydraulic pump according to an increase in an operation amount, wherein the control device includes a target flow rate adjustment means which, when the hydraulic actuator A operation means and the hydraulic actuator B operation means are simultaneously operated, determines an actuator A first required flow rate that the hydraulic actuator A requires from the first hydraulic pump in accordance with an operation amount of the hydraulic actuator A operation means, an actuator B first and second required flow rates that the hydraulic actuator B requires from the first and second hydraulic pumps respectively in accordance with an operation amount of the hydraulic actuator B operation means, total first and second required flow rates that are the sum of required flow rates that the hydraulic actuators including the hydraulic actuator A and the hydraulic actuator B being simultaneously operating respectively require from the first and second hydraulic pumps as a hydraulic supply source, and an actuator B total required flow rate that is the sum of the actuator B first required flow rate and the actuator B second required flow rate, and sets the actuator A first required flow rate as a target flow rate from the first hydraulic pump to the hydraulic actuator A, a flow rate obtained by subtracting the actuator A first required flow rate from a first hydraulic pump maximum discharge flow rate as a target flow rate from the first hydraulic pump to the hydraulic actuator B, and a flow rate obtained by subtracting the target flow rate from the first hydraulic pump to the hydraulic actuator B from the actuator B total required flow rate as a target flow rate from the second hydraulic pump to the hydraulic actuator B.

2. The hydraulic control system in a working machine of claim 1, wherein when the flow rate obtained by subtracting the actuator A first required flow rate from the first hydraulic pump maximum discharge flow rate is equal to or less than an actuator B first minimum flow rate set in advance as a minimum supply flow rate from the first hydraulic pump to the hydraulic actuator B, the target flow rate adjustment means performs first correction and control of target flow rate to correct and set the flow rate obtained by subtracting the actuator B first minimum flow rate from the first hydraulic pump maximum discharge flow rate as the target flow rate from the first hydraulic pump to the hydraulic actuator A, correct and set the actuator B first minimum flow rate as the target flow rate from the first hydraulic pump to the hydraulic actuator B, and correct and set a flow rate obtained by subtracting the actuator B first minimum flow rate from the actuator B total required flow rate as the target flow rate from the second hydraulic pump to the hydraulic actuator B.

3. The hydraulic control system in a work machine of claim 1, wherein when the target flow rate from the second hydraulic pump to the hydraulic actuator B is equal to or greater than an actuator B second maximum flow rate set in advance as a maximum supply flow rate from the second hydraulic pump to the hydraulic actuator B, the target flow rate adjustment means performs second correction and control of target flow rate to correct and set the actuator B second maximum flow rate as the target flow rate from the second hydraulic pump to the hydraulic actuator B.

4. The hydraulic control system in a work machine of claim 2, wherein when the corrected target flow rate from the second hydraulic pump to the hydraulic actuator B is equal to or greater than an actuator B second maximum flow rate that is set in advance as a maximum supply flow rate from the second hydraulic pump to the hydraulic actuator B, the target flow adjustment means performs second correction control of the target flow rate to correct and set the actuator B second maximum flow rate as the target flow rate from the second hydraulic pump to the hydraulic actuator B.

* * * * *